July 20, 1937.   R. J. MINSHALL   2,087,626
METHOD OF CONSTRUCTING AIRPLANE WINGS
Filed March 25, 1935    3 Sheets-Sheet 1
Fig. 1
Fig. 2
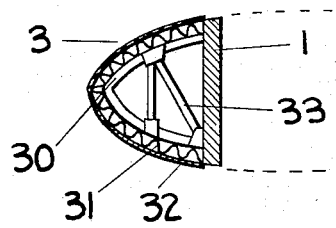
Fig. 3
Fig. 3A
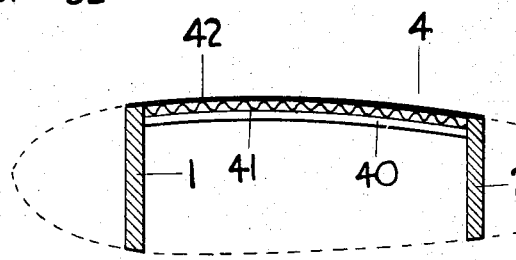
Fig. 4
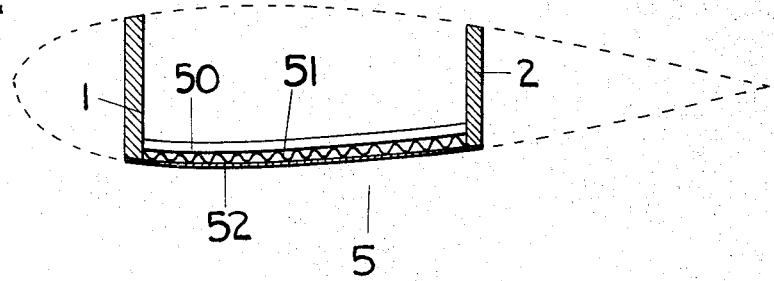
Inventor
Robert J. Minshall
By Charles L. Reynolds
Attorney July 20, 1937.  R. J. MINSHALL  2,087,626
METHOD OF CONSTRUCTING AIRPLANE WINGS
Filed March 25, 1935  3 Sheets-Sheet 2

Inventor
Robert J. Minshall
By Charles L. Reynolds
Attorney

July 20, 1937.  R. J. MINSHALL  2,087,626
METHOD OF CONSTRUCTING AIRPLANE WINGS
Filed March 25, 1935  3 Sheets-Sheet 3

Inventor
Robert J. Minshall
By Charles L. Reynolds
Attorney

Patented July 20, 1937

2,087,626

UNITED STATES PATENT OFFICE 2,087,626

METHOD OF CONSTRUCTING AIRPLANE WINGS

Robert J. Minshall, Seattle, Wash., assignor to Boeing Aircraft Company, Seattle, Wash., a corporation of Washington Application March 25, 1935, Serial No. 12,888

12 Claims. (Cl. 29—84)

My invention relates to the construction of airplane wings, and is particularly designed as a means to facilitate easy and economical fabrication and assembly of an airplane wing of large area and considerable span. The process lends itself either to construction of single airplanes or to quantity production, with but slight modification.

It is an object of the invention to provide a method by which such large wings may be constructed accurately, easily, and economically, and can be readily and securely assembled.

More specifically it is an object to provide a method by means of which wing structures, including a metal skin and a corrugated or otherwise formed stiffening element lying immediately beneath the skin and contacting therewith in a multiplicity of points, may readily be constructed by welding or riveting at such points of contact, and the whole can be easily formed and assembled.

My invention comprises the novel steps and the novel combination of the same, constituting the method, illustrated diagrammatically in the accompanying drawings, and the novel wing construction, all as will be described and claimed in this specification.

In the accompanying drawings I have shown the several steps of my method and typical structure which can be employed in carrying out the method.

Figures 1 to 10 are diagrammatic cross sections through such a wing, illustrating different steps in the process, Figure 3A illustrating an alternative step to that shown in Figure 3.

Figure 5:
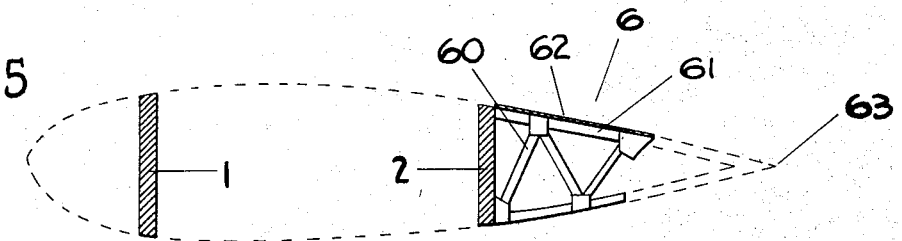
Figure 6:
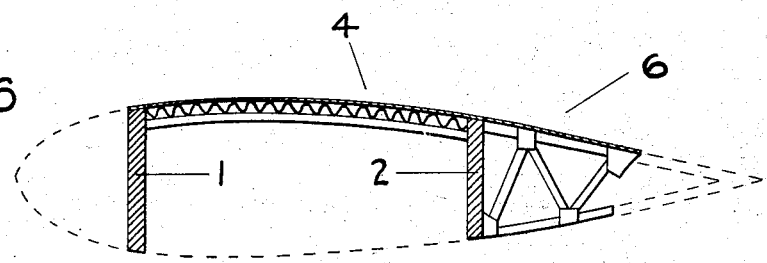

It is recognized that welding constitutes a cheap, secure, and simple way of securing a skin to structural parts, and especially to stiffening means immediately beneath the skin, but in constructing airplane wings having a chord of considerable length, it is difficult to reach into the interior of the wing to accomplish the welding or any equivalent securing operation requiring access to both sides of the joint, or to do the same accurately, and when this must be done at a multiplicity of points, as is necessary in securing a stiffening structure to a skin, this increases unduly the expense of constructing the wing. However, by my method such structures need not be operated upon from the interior of the wing, but indeed the skin and stiffening structure may be secured together in the open and by the usual type of welding apparatus, if a welded joint is to be used, or riveting apparatus if a riveted joint is preferred, and thus not only is accuracy improved, and better securement of parts assured, but the speed with which the work can be done is materially increased and the expense is correspondingly decreased. Moreover, instead of building a large wing as one unit, with parts and pieces difficult to handle and with access thereto restricted, the wing may be constructed of several separately preformed units, each easy of access, and later secured together.

My method will be best understood from a recital of the individual steps, it being understood that these may be somewhat changed, per se or in their order of priority, and that the recital which follows is purely illustrative and not intended to be restrictive, except as required by the context. The welding operation, it will be understood, is similarly merely illustrative of any equivalent operation for securing together at a plurality of points a skin and a stiffening element by mechanism which engages both sides of the joint.

A convenient first step, Figure 1, especially in constructing single airplanes, is to construct the spars which form the backbone of the wing, and these would normally be trussed tubular chord members, of any usual or suitable construction, although any other suitable structure in which there are spaces at intervals, in at least one of the spars, will serve, in so far as my present invention is concerned. Thus in Figures 1 to 10 I have illustrated the forward spar 1 and the rear spar 2 in section, without any attempt to illustrate the details of their construction. If additional spars are required, these may be employed. Such spars, as the usual first step, are fabricated and disposed in the relation which they will occupy in the completed wing.

A convenient second step, Figure 2 (although it is not essential that this step be completed next), is to build a leading edge structure, generally designated by the numeral 3, to fit the forward spar 1. In building one airplane this structure 3 may be built in place on the spar; for quantity fabrication it may be built on a special form or jig. This leading edge structure may conveniently consist of rib members 30 supporting a corrugated member 31 which extends in the direction of the length of the wing, and a metal skin 32 fitted over the corrugated member 31, the whole being suitably braced internally, if and as may be required, and as indicated at 33. The corrugated elements might be omitted, and entire reliance for stiffening be placed on the bracing 33, hence when stiffening means are mentioned it is to be understood to imply either such arrangement. These various elements may be formed and fitted together, and temporarily or partially held in place, then the whole may be placed between the electrodes of a welding apparatus to accomplish the welding together of the several parts at a multiplicity of points, or the parts may be secured by riveting. This operation may be done in place on the spar, since the leading edge structure will not usually be of such depth from front to rear that all points cannot be conveniently reached, but by making the nose piece 3 separately from the remainder of the wing, the welding or riveting operation may be done very quickly, accurately, and conveniently. It is not outside the scope of my invention to form the leading edge structure in more than one part, to be subsequently joined.

Even if the leading edge structure 3 is built and welded together upon the spar 1, it is removed therefrom, usually prior to the next step, which is the building, either in place between the spars as in Figure 3, for a single airplane, or preferably upon a jig, as in Figure 3A, where the expense of a jig is warranted, one of the interspar surfaces, for example the upper surface 4. This surface 4, like the leading edge structure 3, is shown as consisting generally of rib elements 40, a stiffening structure 41, usually a corrugated sheet, the corrugations of which extend lengthwise of the wing, and a metal skin 42 with which the corrugated structure 41 contacts at a multiplicity of points. Since only the one surface is constructed at a time, it is easy to apply the electrodes E and E' of a welding machine to the upper and lower surfaces of the structure 4, as is illustrated in Figure 3A, though the welding will preferably be accomplished by removing this surface and moving it between the electrodes of a welding machine, first fixing parts in place. Any equivalent method of securing the skin permanently to the stiffening structure may be employed. Thus the structure is quickly, conveniently, and accurately secured together. If the surface 4 is completed on the wing spars it will usually be removed, therefrom, to afford free access to the second interspar surface, to be built in place on the spars, unless the latter is made as a jig as in Figure 3A.

The next step, Figure 4, is to construct a second interspar surface, and if we assume that the first such surface was the upper surface 4, the next to be built is the lower surface 5, which similarly includes the ribs 50, the stiffening elements 51, usually, as before, a corrugated sheet, and the skin 52. The manner of building this is or may be the same as that described for the surface 4.

This surface 5 may now be removed, if it has been built and welded while in place between the spars, and as in Figure 5 there is built, conveniently in place upon the rear spar 2, or upon a jig, a part of a trailing edge structure, generally designated as a whole by the numeral 6, and including the upper skin 62 and the connecting stiffening elements such as the bracing or struts 60 and the ribs 61. Preferably one skin is not put in place, and this may conveniently, though not necessarily, be the lower skin. The wing as shown is notched to receive an aileron, and may also be formed with a recess for the reception of a trailing edge flap, and in such recesses the ribs stop short of the extreme trailing edge, though at other points they may extend to this trailing edge, indicated at 63. Bolts or rivets may conveniently be employed in building this structure, although the principles indicated above may be employed, welding each surface separately.

Figure 7:
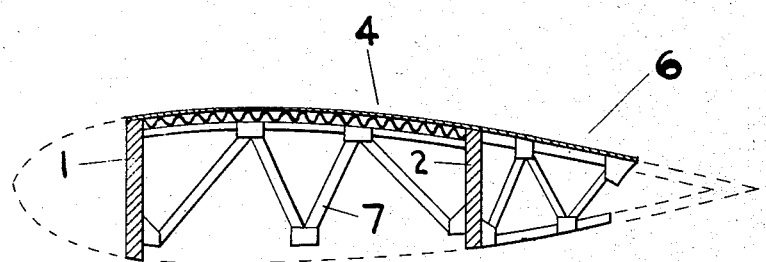
Figure 8:
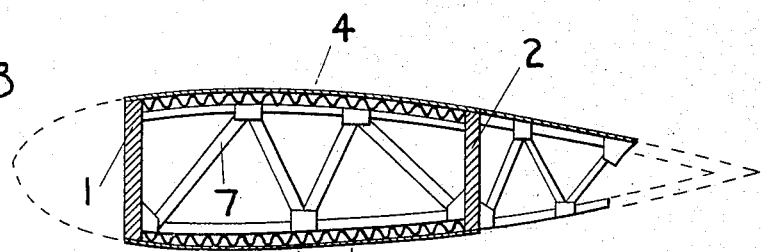
Figure 14:
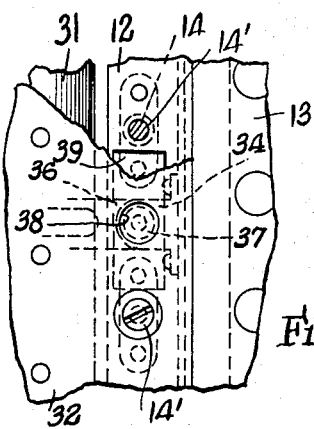
Figure 14 is an under side plan view, with parts broken away, illustrating details of the securing means shown in Figure 11.
Figure 9:
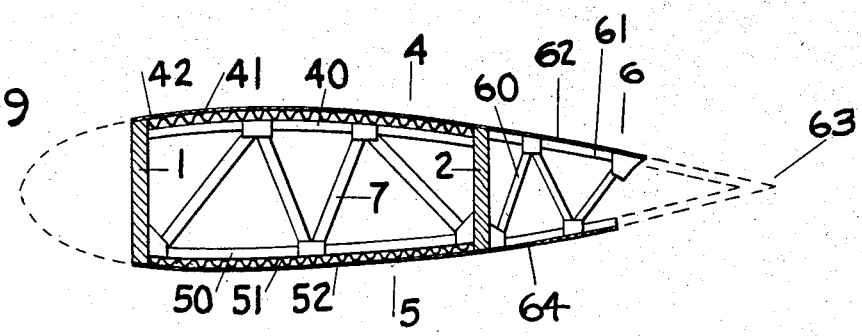

The trailing edge structure so far constructed may be left in place, if built on the rear spar 2. There is now installed one of the interspar surfaces, previously constructed, for example the upper surface 4. See Figure 6. This may be installed conveniently prior to installation of the trailing edge structure, if the latter is built on a separate jig, although if such trailing edge structure is built in place upon the spar it need not be removed. This interspar structure is secured to the spars, and since the wing is largely open, this is a simple matter to accomplish, by riveting or bolting on. Either before or after its installation there are connected to it such intersurface struts or bracing means as may be required, generally indicated by the numeral 7, as seen in Figure 7. Next, as in Figure 8, there is installed the opposite surface, for example the surface 5, by bolting or riveting, and the purpose of leaving off the lower skin from the trailing edge structure now becomes apparent, for, with this trailing edge structure installed prior to installation of both interspar structures, and to the connection thereto of the intersurface bracing 7, this permits the workmen to reach through the rear spar 2, and the omission of the leading edge structure from the spar 1 permits the workmen to reach through this spar, and thus the surface 5 may readily be connected to the spars and to the intersurface bracing means 7.

Figure 10:
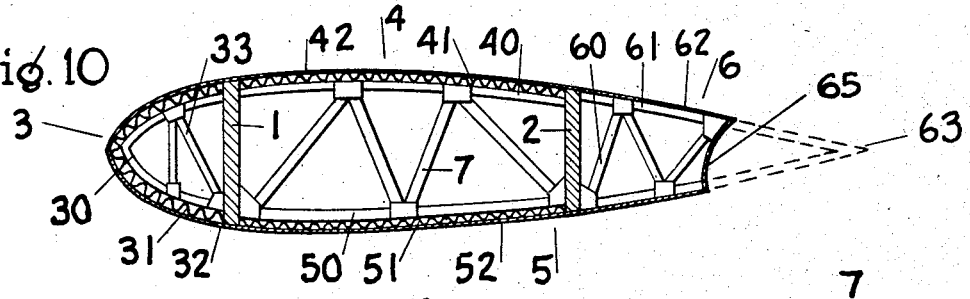
Figure 12:
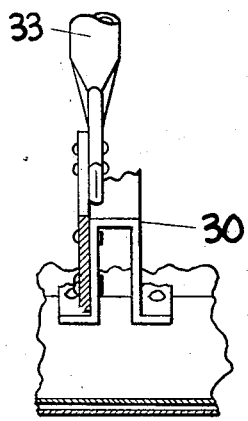
Figure 12 is a detail section on the line 12—12 of Figure 11.

Now, without regard to which step is taken next, there are installed the omitted lower skin 64 of the trailing edge structure (see Figure 9), the interior of which can be reached through the space between the rear edges of the skins 62 and 64, the leading edge structure 3, which is secured by means which will be described in detail hereafter, and finally the closure 65 for the aileron notch or flap recess. The latter may be installed by means which are not flush with the skin, since this cover 65 normally forms no part of the aerodynamical surface, and therefore projections above this surface will not detract from the efficiency of the wing as a whole. The final result is seen in Figure 10.

Figure 11:
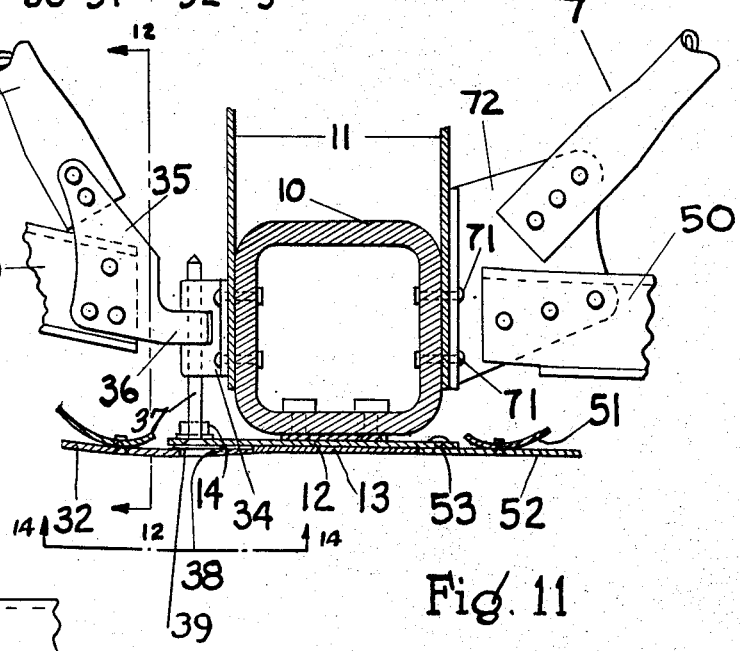
Figure 11 is a detail through a spar chord showing the manner in which the several parts may be joined to such a spar.
Figure 13:
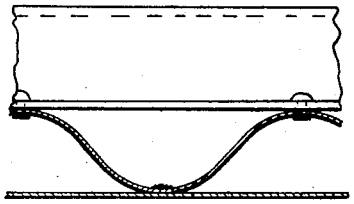
Figure 13 is an enlarged section through the skin and associated parts, showing the details of securing the several parts together.

In Figure 11 is shown a chord member 10 for the front spar 1 with the truss members 11. The intersurface bracing means 7 may readily be riveted, as indicated at 71, to the spar or to the tube 10 by means of suitable brackets 72. This work is accomplished before the leading edge structure is installed. Now before the leading edge structure is installed there is secured to the tube 10 a bracket or clip 34, and a complemental member 35, secured to the leading edge structure, is provided with a finger 36 which is received in the bracket 34. Beneath the spar 1 are secured two plates extending lengthwise of the wing, the edges of the inner plate 12 overhanging both forwardly and rearwardly the edges of the outer plate 13. The skin 52 is riveted, at 53, to the plate 12 prior to the placement of the leading edge. The skin edge spacer or filler plate 13 is substantially the same thickness as the skin, and, being secured outwardly of the plate 12, its rearward edge abuts and lies flush with the skin 52. Similarly, when the leading edge section is in place, the forward edge of this plate 13 abuts and lies flush with the skin 32, to preserve the continuity of the airfoil surface.

When the finger 36 has been engaged in the bracket 34 a pin 37 may be slipped through a hole 38 left in the skin and plate 12 to interconnect the two. Upward movement of the pin is limited by its head seating in the plate 12. Downward movement of the pin 37 may be prevented by inserting a thin shim 39 between the edges of the skin 32 and the spacer plate 13 prior to securing the skin 32 to the plate 12. This shim will extend over the hole 38 in the skin, and will be clamped in place between the skin 32 on one side and the plate 12 and the head of the bolt 37 on the other. A nut and washer 14 are welded or otherwise secured to the upper side of plate 12 to receive a flush bolt 14' extending through the skin 32 and plate 12, to secure the rear edge of the skin and to clamp the shim 39 in place. A similar construction may be employed at the top of the leading edge structure, that illustrated being the bottom connection. Such a means of securement may be employed for the trailing edge structure, if it be preferred to secure the latter in place after the leading edge structure.

By this process all parts may be strongly constructed, and may be strongly united, yet will be exceedingly light and free from all projections, and because of the possibility of employing welding or riveting the construction may be done rapidly and accurately. One crew of workmen may construct each separate structure, unimpeded by any other crew, and by such simultaneous construction of separate parts the whole wing can be made more rapidly, cheaply, and better than by the old method of building the entire wing as one operation.

In the claims, it will be understood that where it is stated that certain surfaces are constructed on the spars, and that this may be done when constructing a single airplane, or when the magnitude of the job does not warrant the building of special frames or jigs, these surfaces may equally well be built in such frames or jigs, and that this is intended as the equivalent of building them on the spars and is to be construed as within the wording employed.

What I claim as my invention is:

1. The method of constructing airplane wings, for their support on spaced spars, which comprises the steps of building separately the leading edge structure to fit the front spar, the upper interspar surface, and the lower interspar surface, each to fit between the spars, and the trailing edge structure, minus the skin at one side, and then, in succession, installing the same on the rear spar, installing one of the interspar surfaces in place, building the intersurface bracing between the spars and secured to the installed interspar surface, installing the other interspar surface in place and connecting to the same the intersurface bracing, and thereafter, without regard to priority, installing the other trailing edge skin, the leading edge structure, and the control surface closures.

2. The method of constructing airplane wings including corrugated elements immediately underlying a metal skin, for their support on spaced spars, which comprises the steps of building separately, to their final shape, the leading edge structure to fit the front spar, the upper interspar surface, and the lower interspar surface, each to span the space between spars, and in each instance employing an operation requiring access to both sides of the joint to join the skin at a multiplicity of points to the associated inner corrugated element, then, in succession, building the trailing edge structure to fit and installing the same on the rear spar, omitting the skin at one side to leave an opening to the interior, installing one of the interspar surfaces in place, installing the second interspar surface and connecting the two through the openings formed at the front by omission of the leading edge structure and at the rear by omission of the skin from one side of the trailing edge structure, and thereafter, without regard to priority, installing the previously omitted trailing edge skin, the leading edge structure, and the control surface closures.

3. The method of constructing airplane wings, which includes the step of preforming separately, a composite upper interspar surface and a lower interspar surface, each comprising a stiffening element contacting with and secured at many points to a metal skin, and thereafter disposing such surfaces, with interconnecting bracing, in proper relationship, spaced apart at front and rear, and then connecting such surfaces and the bracing by reaching through such spaces.

4. The method of constructing airplane wings, of the type which includes two spaced spars having openings therethrough, from separately preformed leading edge, and upper and lower interspar structures, the two latter structures including a skin secured at a multiplicity of points to a stiffening element immediately therebeneath, and a trailing edge structure having the skin omitted from one side thereof, which method comprises installing the previously completed upper and lower interspar structures and the trailing edge structure, by reaching through the openings in the spars, and that left by the omitted skin, and thereafter installing the previously omitted skin on the trailing edge structure and installing the leading edge structure.

5. The method of constructing airplane wings which comprises assembling on spaced spars preformed unitary structures having skin sections secured to stiffening and supporting structural members at a multiplicity of points, by the successive steps of (1) installing the trailing edge structure with the skin omitted from one side thereof on and securing it to the rear spar, (2) installing the upper interspar surface structure in place by movement thereof transversely of the length of the wing, (3) installing the intersurface bracing between the spars and securing it to the spars and upper interspar structure, (4) installing the lower interspar surface structure in place by movement thereof transversely of the length of the wing, and connecting the same to the intersurface bracing, by reaching through the spars, and through the opening left by the omitted skin of the trailing edge structure, (5) thereafter, without regard to priority, installing the previously omitted trailing edge skin, the leading edge structure, and the control surface covers.

6. The method of constructing airplane wings, including spaced spars having openings therethrough, a leading edge structure to fit the front spar, upper and lower interspar surface structures each to fit between the spars, and a trailing edge structure to fit the rear spar, each structure including as parts secured in their final relation skin sections and supporting and stiffening structure, the skin structure being omitted at one side of the trailing edge structure, which method comprises, without regard to priority, installing the trailing edge structure on the rear spar, installing one of the interspar surface structures in place, building the intersurface bracing between the spars, installing the other interspar surface structure in place, and connecting to the same the intersurface bracing, by reaching through the spars and through the hole in the trailing edge structure left by the omitted skin, and thereafter, without regard to priority, installing the omitted trailing edge structure skin, the leading edge structure, and the control surface closures.

7. The method of constructing airplane wings including corrugated elements immediately underlying and secured at a multiplicity of points to a metal skin, and spaced wing spars having openings therethrough, from structures separately built to their final state including a leading edge structure to fit the front spar, an upper interspar surface structure, a lower interspar surface structure, each built to span the space between spars, each interspar structure including separate corrugated stiffening sections and skin sections joined together at a multiplicity of points, and a trailing edge structure to fit the rear spar and having the skin at one side thereof omitted, which method comprises the steps, in succession, of installing one of the interspar surface structures in place, installing the second interspar surface structure in place, and connecting the two through the openings in the spar at the front and at the rear, and without regard to priority, securing the trailing edge structure to the rear spar by access gained through the omitted skin, installing the previously omitted trailing edge skin, the leading edge structure, and the control surface covers.

8. The method of constructing airplane wings which includes the steps of installing an upper interspar surface structure of a length approximating the length of the wing, and including permanently interconnected stiffening and skin elements, between wing spars by movement thereof transversely of the length of the wing, thereafter installing intersurface bracing members and connecting the same to the spars and to the installed interspar surface structure, and thereafter installing the other preformed interspar surface structure, of like length, and including permanently interconnected stiffening and skin elements, and connecting such last mentioned structure to the intersurface bracing by reaching through the spars, into the space between such surface structures, at front and rear.

9. The method of constructing airplane wings which includes the steps of installing an interspar surface structure, including permanently interconnected stiffening and skin elements, between wing spars by movement thereof transversely of the length of the wing, thereafter installing intersurface bracing members and connecting the same to the spars and to the installed interspar surface structure, and thereafter installing the other preformed interspar surface structure including permanently interconnected stiffening and skin elements, and connecting such last mentioned structure to the intersurface bracing by reaching through the spars, into the space between such surface structures at front and rear, and subsequently installing a preformed leading edge structure and a trailing edge structure to enclose the spars.

10. The method of constructing an interspar section of an airplane wing, which comprises constructing as separate units, each having embodied therein a portion of the wing skin permanently attached to stiffening and bracing structure, a complete upper interspar section and a complete lower interspar section, each of a length substantially equal to the length of the wing, placing the upper and lower interspar sections in assembled position upon the spars by movement thereof transversely of the length of the wing, and securing the interspar sections to the spars by reaching through such spars.

11. The method of constructing a portion of an airplane wing including an interspar section and an adjacent marginal section, which comprises constructing as separate units, each having embodied therein a portion of the wing skin permanently attached to stiffening and bracing structure, a complete upper interspar section and a complete lower interspar section, and as a further separate unit an incomplete marginal section, attaching to a spar the incomplete marginal section, placing the upper and lower interspar sections in assembled position upon the spars by movement thereof transversely of the length of the wing, securing the two interspar sections to the spars by reaching through the incomplete marginal section and such spars, and thereafter completing fabrication of such marginal section.

12. The method of constructing an airplane wing which comprises first constructing as separate units, each having embodied therein a portion of the wing skin permanently attached to stiffening and bracing structure, a complete upper interspar section, a complete lower interspar section, a complete leading edge section, and an incomplete trailing edge section, securing the trailing edge section to the rear spar, placing the upper and lower interspar sections in assembled position upon the spars by movement thereof transversely of the length of the wing, securing the interspar sections to the spars by reaching through such spars, and thereafter attaching to the front spar the leading edge section and completing the trailing edge section.

ROBERT J. MINSHALL.